US006801302B2

(12) United States Patent
Mancuso et al.

(10) Patent No.: US 6,801,302 B2
(45) Date of Patent: Oct. 5, 2004

(54) PLATE REGISTERING SYSTEM AND METHOD OF OPERATION

(75) Inventors: Anthony J. Mancuso, Melrose, MA (US); Aron Mirmelshteyn, Marblehead, MA (US)

(73) Assignee: Agfa Corporation, Wilmington, MA (US)

( * ) Notice: Subject to any disclaimer, the term of this patent is extended or adjusted under 35 U.S.C. 154(b) by 0 days.

(21) Appl. No.: 10/336,898

(22) Filed: Jan. 6, 2003

(65) Prior Publication Data

US 2004/0131352 A1 Jul. 8, 2004

(51) Int. Cl.[7] .......................... G03B 27/58; B65H 9/00

(52) U.S. Cl. .......................... 355/72; 271/13; 271/228; 271/238; 271/240; 271/248; 271/255

(58) Field of Search .......................... 355/72–75; 271/13, 271/228, 238–240, 255

(56) References Cited

U.S. PATENT DOCUMENTS 2,528,106 A 10/1950 Albrecht
3,897,053 A * 7/1975 Guy .......................... 271/238
4,311,304 A * 1/1982 Hamada et al. ............... 271/13
4,506,879 A * 3/1985 Goodwin et al. ........... 271/238
4,657,239 A 4/1987 Ikesue
5,098,081 A 3/1992 DeFigueiredo
6,209,866 B1 * 4/2001 Hosking et al. ............ 271/228
2002/0140802 A1 * 10/2002 Yamada ...................... 347/262

FOREIGN PATENT DOCUMENTS

EP 1306331 A1 5/2003

* cited by examiner

*Primary Examiner*—D. Rutledge
(74) *Attorney, Agent, or Firm*—Robert A. Sabourin; J. Grant Houston

(57) ABSTRACT

A substrate manager for a substrate exposure machine is used, in one example, as a platesetter. As such, it comprises a substrate storage system, containing one or more stacks of substrates, such as plates in one implementation. A substrate picker is provided for picking substrates from the stack of substrates. The substrates are then handed to a transfer system that conveys the substrates to an imaging engine. A substrate registration system is provided upstream of the imaging engine. The substrate registration system includes (1) a substrate transfer system for supporting and conveying substrates and (2) at least one engaging member for pushing the substrates on the substrate transfer system to a desired position. Preferably, two sets of engaging members are used, one on either side of the plates. This allows angular as well as positional registration. The substrate transfer system includes a frame and a series of rollers for supporting the substrates.

3 Claims, 3 Drawing Sheets

PLATE REGISTERING SYSTEM AND METHOD OF OPERATION

BACKGROUND OF THE INVENTION

Imagesetters and platesetters are used to expose the substrates in many conventional offset printing systems. Imagesetters are typically used to expose the film that is then used to make the plates for the printing system. Platesetters are used to directly expose the plates.

For example, plates are typically large substrates that have been coated with photosensitive or thermally-sensitive material layers, referred to the emulsion. For large run applications, the substrates are fabricated from aluminum, although organic substrates, such as polyester or paper, are also available for smaller runs.

Computer-to-plate printing systems are used to render digitally stored print content onto these printing plates. Typically, a computer system is used to drive an imaging engine of the platesetter. In a common implementation, the plate is fixed to the outside or inside of a drum and then scanned with a modulated laser source in a raster fashion.

The imaging engine selectively exposes the emulsion that is coated on the plates. After this exposure, the emulsion is developed so that during the printing process, inks will selectively adhere to the plate's surface to transfer the ink to print medium.

Automated systems exist for handling the substrates before and after exposure in the imaging engine. These management systems typically pick individual substrates from cassettes and then feed the substrates to the imaging engine. Thereafter, the substrates are unloaded and passed on for further processing.

SUMMARY OF THE INVENTION

The plate must be properly feed into the imaging engine. These are high-resolution devices. They can compensate for some angular and positional misalignment of the plate on the drum, but if the positional or angular misalignment is too large, it can impact the performance of these imaging engines.

The present invention is directed to a substrate registration system for a substrate exposure machine, such as a platesetter or imagesetter. Specifically, it moves the plate or substrate to a known or desired position, so that the plate or substrate can then be properly inserted into the imaging engine and typically installed around its drum. Such registration is critical to the proper handling of plates in these plate management systems.

In general, according to one aspect, the invention features a substrate registering system for a substrate exposure machine. In a typical example, the substrate exposure machine is a platesetter or imagesetter. The substrate registering system comprises a substrate transfer system for supporting and conveying substrates in the substrate exposure machine. At least one engaging member is provided for pushing the substrates on the substrate transfer system to a desired position.

In a current implementation, the substrate transfer system comprises a frame and a series of rollers for supporting the substrates. The rollers are driven to convey the substrates relative to the substrate transfer system in the fashion of a conveyor. Typically, the substrates are moved from a substrate store to the imaging engine.

The engaging members extend typically in a direction that is orthogonal to the plane of the substrate transfer system. The engaging members move in a direction that is perpendicular to a direction in which the substrates are conveyed by the substrate transfer system. In this way, they can push the substrates to the desired position on the substrate transfer system.

In a preferred embodiment, at least one right engaging member and at least one left engaging member are provided to contact opposed sides of the substrates. In this way, they can move the substrates to a desired position, typically in the center of the substrate transfer system. This also allows the substrates to be angularly aligned.

In general, according to another aspect, the invention also features a method for moving plates in a platesetter. This method comprises picking plates from a plate store. The plates are then conveyed to an imaging engine for exposure. Prior to loading the plates in the imaging engine, however, the plates are registered to a desired position.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
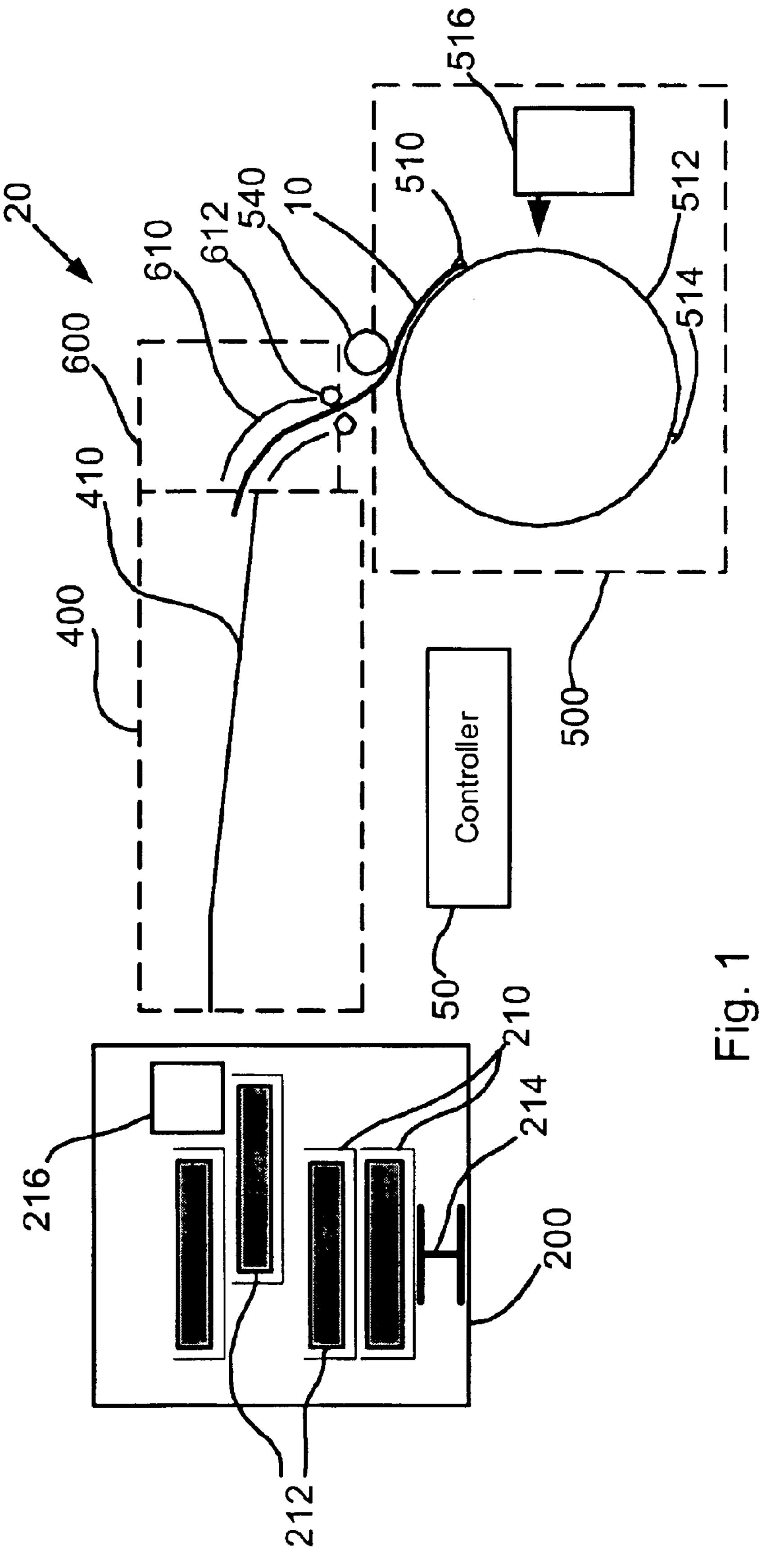
FIG. 1 is a schematic, side plan view of a plate manager according to the present invention.

FIG. 1 shows a substrate, and more specifically a plate, manager 20, which has been instructed according to the principles of the present invention.

Generally, the plate manager 20 comprises a plate store 200, a plate transfer system 400, a plate inserter 600, and a plate imaging engine 500, all of which are controlled by a system controller 50.

The plate storage system 200 comprises, when loaded, multiple cassettes 210. Each of these cassettes 210 holds a stack of plates 212. The cassettes are moved vertically within the plate store 200 by a cassette elevator or lifter 214.

In one example, the cassettes themselves are stored in stacks of cassettes and moved vertically by the cassette elevator 214 so that the stack of plates 212 of a specific cassette 210 is raised to the level of a plate picker system 216. Once the cassette 212 is at the proper height, it is moved laterally. The cassette 212 is thereby positioned underneath the plate picker system 216, which then picks a plate off of the stack of plates 212.

The plate picker system 216 provides individual plates from the stack of plates 212 to the plate transfer system 400.

This transfer system 400 currently comprises a conveyer 410 that receives the plate 10 and then moves the plate 10 laterally in the plate manager 20 toward the plate imaging engine 500.

Between the plate imaging engine 500 and the transfer system 400 is a plate inserter system 600. The angle of the plate is moved from a generally horizontal orientation as it is received from the transfer system 400 to a more vertical orientation to be compatible for insertion into the plate imaging engine 500. Specifically, the plate is angled at 75 degrees from horizontal for insertion into the engine.

Specifically, the plate inserter system 600 comprises an inserter arcuate transfer path 610. It moves the plate from its horizontal position as it is transferred across the conveyer 410 to a more vertical orientation. Specifically, it transfers the plate 10 so that it is received by a first set of output pinch rollers 612.

The plate imaging engine 500 receives the plate 10 from the plate inserter system 600. The plate is brought into engagement with a header clip 510 on the exterior of drum 512 of the imaging engine 500. The drum 512 is then advanced so that the plate 10 is progressively installed on the outside perimeter of the drum 512 by ironing roller 540 until a trailing edge clip 514 engages its trailing edge.

At this stage, the plate 10 is selectively exposed by a laser scanning system 516. Typically, this is a high speed, high power laser scanning system that selectively exposes the emulsion on the plate 10 with the desired image, in a raster fashion. Afterward, the plate 10 is typically ejected from the plate imaging engine 500 to further machines for development and further processing.

Figure 2:
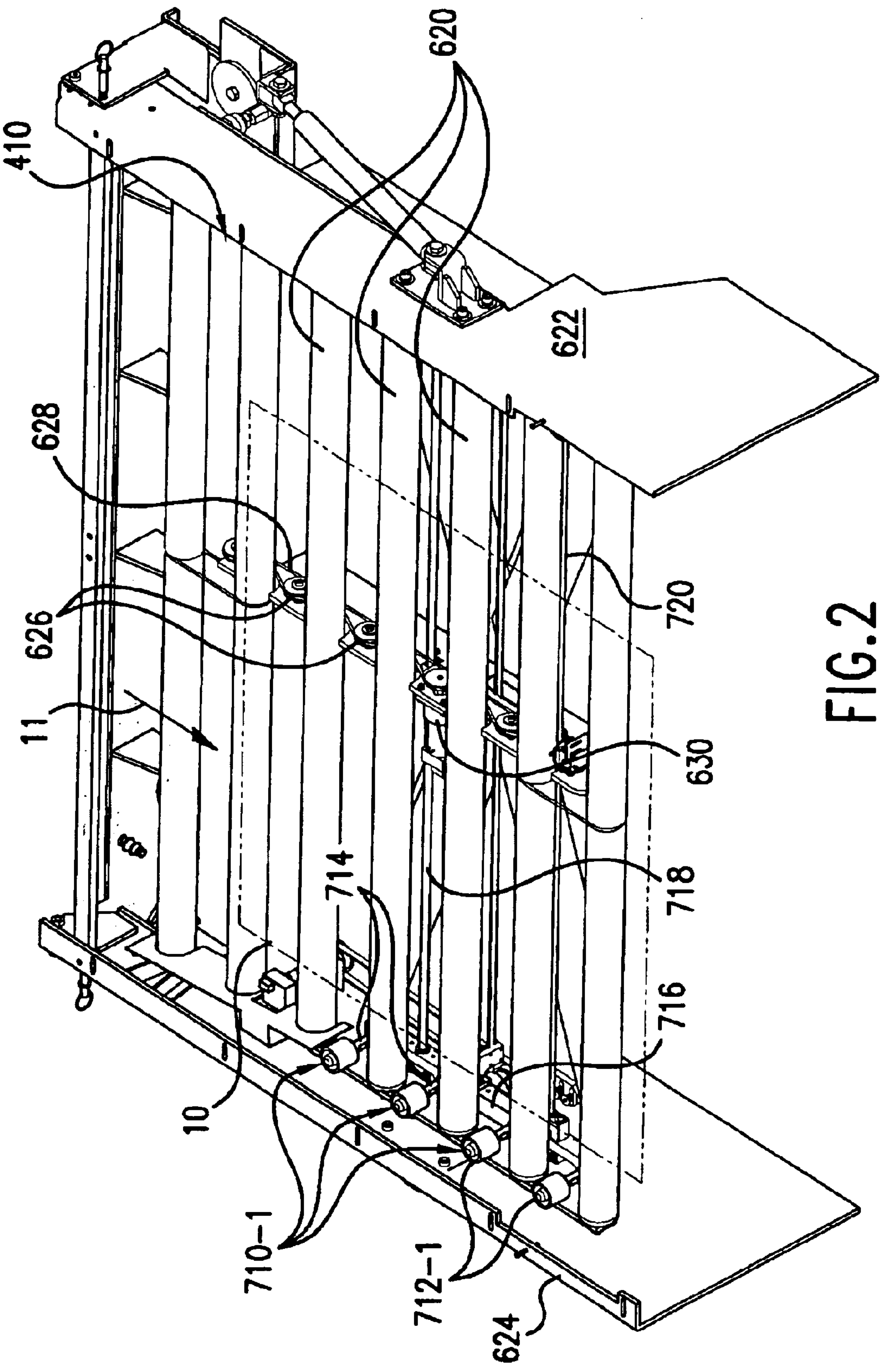
FIG. 2 is a perspective view showing the substrate transfer system and the substrate registration system according to the present invention.

FIG. 2 shows the plate conveyer 410 of the plate transfer system 400. It comprises a series of rollers 620. These rollers are supported to rotate on a right frame member 622 and a left frame member 624. These rollers 620 generally form an upper planar surface on which the plate 10 is supported.

A roller drive belt 628 strung over on a series of conveyor pulleys 626 that are disposed between each of the rollers 620. As a result, the roller drive belt 628 is urged into engagement with the outer surfaces of the rollers 620. Thus, when a roller drive motor 630 is driven under the control of the controller 50, the roller drive belt 628 causes the rollers 620 to rotate in a counter clockwise direction and thereby move or convey the plate 10 in the direction of arrow 11 to the imaging engine 500.

The inventive substrate registering system comprises a set of engaging members 710. In the orientation of FIG. 2, only the left engaging members 710-1 are shown. There is, however, a second set of right engaging members in the preferred embodiment.

Each one of the engaging members 710 comprises a wheel 712 that is held generally at the plane of the substrate 10. The wheels 712 are oriented to rotate around an axis that is orthogonal to the plane of the conveyer 410 and thus plate 10. As a result, they can engage the sides of the substrate 10, even while the conveyer 10 is conveying the plate or substrate 10 in the direction of arrow 11.

The wheels 712 are supported on respective wheel axles 714. These, in turn, project upwards from a rack 716.

Figure 3:
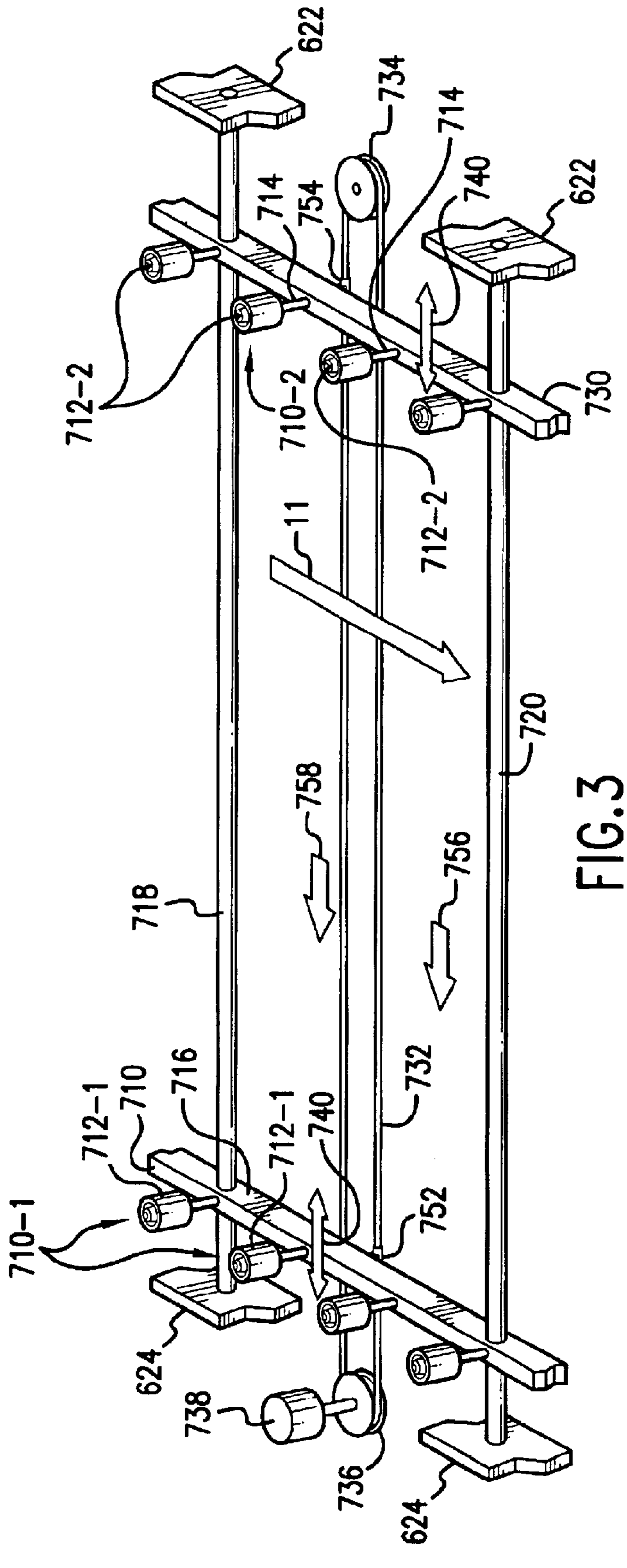
FIG. 3 is a schematic perspective view showing the inventive substrate registration system.

FIG. 3 shows the substrate registering system with the conveyer 410 removed and portions of the right and left frame members 622, 624 cut away. Specifically, there is a set of left engaging members 710-1 and a set of right engaging members 710-2. These members, in turn, are supported by a respective left rack 716 and a right rack 730. The racks 716 and 730 are supported to ride or slide on a front rail 720 and rear rail 718, which are supported by the right and left frame members 622, 624. As a result, the racks 716 and 730 are held in a parallel orientation relative to each other and extend in the direction of plate travel, see arrow 11.

The racks 716, 730 are free to slide in the direction of arrows 740. As a result, when the racks are moved toward each other, the wheels 712-1, 712-2 are moved toward each other to thereby engage a plate between the left wheels 712-1 and the right wheels 712-2. This movement and engagement causes the plate 10 to be brought into angular alignment and centered in the middle of the conveyor 410.

In the present embodiment, the left rack 716 and the right rack 730 are moved using a combination of a timing belt 732, timing belt pulleys 734, 736 and a rack drive motor 738. Specifically, the left rack 716 is connected to a proximal side of the timing belt 732, see connection point 752, whereas the right rack 730 is connected to the other, or distal, side of the timing belt 732, see connection point 754. As a result, when the timing belt 732 is advanced in the direction of arrow 756 (clockwise), the left rack 716 and the right rack 730 are moved away from each other to thereby disengage from a plate 10 that is located between the left wheels 712-1 and the rights wheels 712-2.

In contrast, when the timing belt is driven by the motor 738 to move in the direction of arrow 758 (counterclockwise), the right rack 716 and the left rack 730 are moved toward each other to thereby bring the wheels 712-1, 712-2 into engagement with the plate 10 on the conveyer 710. This results in the plate 10 being centered on the conveyor 410 and brought into angular alignment.

While this invention has been particularly shown and described with references to preferred embodiments thereof, it will be understood by those skilled in the art that various changes in form and details may be made therein without departing from the scope of the invention encompassed by the appended claims.

What is claimed is:

1. A registration system for center registration of a printing plate being transferred via a substrate transfer system to an exposure machine, the registering system comprising:

a set of moveable left engaging members comprising left wheels for moving to engage a left side of the printing plate;

a set of moveable right engaging members comprising right wheels for moving to engage a right side of the printing plate;

a moveable left rack for supporting the set of left engaging members;

a moveable right rack for supporting the set of right engaging members;

one or more rails for supporting and allowing movement of the left and right racks towards and away from one another, said rails supporting the left and right racks in parallel with one another and said rails longitudinally extending in parallel to a direction of travel of the printing plate being transferred; and a rack drive motor for simultaneously moving the left and right racks towards one another along the one or more rails, causing one of the sets of left and right engaging members to engage and center the printing plate along the substrate transfer system.

2. The registration system as claimed in claim 1, wherein the exposure machine is an imaging engine.

3. The registration system as claimed in claim 1, wherein the left and right engaging members move in a direction that is perpendicular to the direction of travel of the printing plate being transferred.

* * * * *